United States Patent [19]

Schäfer et al.

[11] Patent Number: 4,546,123

[45] Date of Patent: Oct. 8, 1985

[54] POLYMER HYDROGELS ADAPTED FOR USE AS SOFT CONTACT LENSES, AND METHOD OF PREPARING SAME

[75] Inventors: Doris Schäfer; Rolf Schäfer, both of Arisdorf, Switzerland

[73] Assignee: Alcon Laboratories, Inc., Fort Worth, Tex.

[21] Appl. No.: 687,277

[22] Filed: Dec. 28, 1984

[51] Int. Cl.$^4$ .......................... C08K 9/12; C08K 5/34; C08K 5/05; C08F 6/28

[52] U.S. Cl. ..................................... 523/106; 523/108; 523/200; 525/375; 525/376; 525/384; 525/386; 525/907; 526/320; 528/488

[58] Field of Search ................. 523/106, 108, 200; 525/375, 376, 384, 386, 907; 528/488

[56] References Cited

U.S. PATENT DOCUMENTS

| | | | |
|---|---|---|---|
| 2,976,576 | 3/1961 | Wichterle et al. | 18/58 |
| 3,220,960 | 11/1965 | Wichterle et al. | 260/2.5 |
| 4,097,657 | 6/1978 | Sieglaff et al. | 525/382 |
| 4,128,318 | 12/1978 | Sieglaff et al. | 351/160 |
| 4,143,203 | 3/1979 | Rigopulos et al. | 525/329.1 |
| 4,328,134 | 5/1982 | Schally et al. | 525/54.11 |
| 4,338,419 | 7/1982 | Korb et al. | 525/330.4 |
| 4,379,893 | 4/1983 | O'Malley et al. | 523/106 |
| 4,388,428 | 6/1983 | Kuzma et al. | 523/108 |
| 4,423,099 | 12/1983 | Mueller et al. | 525/903 |
| 4,450,262 | 5/1984 | Drake et al. | 523/106 |
| 4,451,568 | 5/1984 | Schneider et al. | 204/159.23 |
| 4,452,925 | 6/1984 | Kuzma et al. | 523/108 |
| 4,495,313 | 1/1985 | Larsen | 523/108 |

*Primary Examiner*—Herbert J. Lilling
*Attorney, Agent, or Firm*—Lowe, King, Price & Becker

[57] ABSTRACT

The improved polymeric hydrogel suitable for use in forming soft contact lenses is described. The hydrogel is improved by means of its resistance to the formation of calcium, lipid and protein deposits thereon. This resistance is achieved by means of covalent modification of the hydrogel with a surfactant.

21 Claims, No Drawings

POLYMER HYDROGELS ADAPTED FOR USE AS SOFT CONTACT LENSES, AND METHOD OF PREPARING SAME

BACKGROUND OF THE INVENTION

1. Field of the Invention

The present invention relates to modified polymer hydrogels specially adapted for use as soft contact lenses. More specifically, this invention relates to covalent modification of the polymer hydrogel forming the contact lens surface or matrix with a surfactant in order to prevent or substantially reduce the formation of calcium, lipid and protein deposits on the lens when worn on the human eye.

2. Description of Related Art

The rapid formation of calcium, lipid and protein deposits on human worn soft contact lenses is one of the most severe problems associated with the use of these lenses. The removal of such deposits with cleaning agents is not always possible, and in some cases may create additional problems. Accordingly, the development of soft contact lenses which are resistant to the formation of such deposits has been greatly desired.

Copolymers based on acrylic esters may be utilized to form the so called polymeric hydrogels which are widely in use as soft contact lenses. These copolymers contain polar functional groups and have a matrix which is able to bind a high percentage of water and a variety of chemicals.

The known methods of modifying soft contact lenses with chemicals to prevent the formation of calcium, lipid or protein deposits are based on molecular absorption principles. These methods may be summarized as follows:

A. Soft contact lenses which are dipped into aqueous solutions of polyamines or polyquats tend to absorb these molecules, whereby the lenses may become positively charged. As a result of this modification, the lenses repel calcium ions and consequently are resistant to the formation of calcium deposits.

B. Soft contact lenses which are dipped into aqueous solutions of surfactants develop characteristics which prevent lipid and protein deposits.

In the above-identified methods, the chemical agents are sorbed at least at the lens surface by electrostatic interaction or van der Waals' forces. The antideposit activity is lost when the modified lenses are washed with cleaning agents or rinsed thoroughly with physiological salt solution, i.e., the activity for the prevention of calcium, lipid or protein deposits disappears as a function of the order of magnitude of the migration and separation of the chemical agents from the lens surface.

It is known that incubation of soft contact lenses with polyamines or aminoalcohols in aqueous solutions at elevated temperatures results in covalent linkage of the amine through an interchange reaction of the acrylic ester residues of the lens matrix, forming covalent C—N bonds in the polymer structures; see in this regard U.S. Pat. Nos. 4,097,657 and 4,128,318. In this case, molecular migration or separation of the chemical agent cannot take place, and the modified soft contact lenses are reported to be resistant to substances which cause lens clouding.

SUMMARY OF THE INVENTION

A principal object of the present invention is the provision of modified polymer hydrogels which are resistant to the formation of calcium, lipid and protein deposits thereon, and the provision of a method for modifying polymer hydrogels to create this resistance.

The above-stated objects and other general objects of the present invention are achieved by the provision of a modified acrylic acid based polymeric hydrogel containing polar hydroxyl and/or carboxyl functional groups, said polymer having been modified by treating the unmodified polymer with a surfactant in the presence of a carbodiimide coupler and either an organic solvent or a saline solution.

DESCRIPTION OF PREFERRED EMBODIMENTS

Polymeric hydrogels suitable for use in soft contact lenses contain at least one functional group in addition to ester groups. These functional groups are polar and may comprise hydroxyl or carboxyl groups, for example. Acrylic acid-based polymeric hydrogels of the above-described type are described in U.S. Pat. Nos. 2,976,576 and 3,220,960; the entire contents of these patents are incorporated herein by reference. The discussion presented below is directed to the modification of acrylic acid-based polymeric hydrogels, but is believed to be equally applicable to any polymeric hydrogel having at least one suitably reactive functional group.

The polymeric hydrogels are modified by combining the unmodified hydrogel with a surfactant in a modification regulating medium which contains a carbodiimide coupling agent as catalyst. The specific type of surfactant utilized is dependent on the nature of the polymeric hydrogel functional groups. If the polymeric hydrogel contains a hydroxyl functional group, this group may be covalently modified by treatment with carboxylated surfactants of formula R—O(CH$_2$—CH$_2$—O)$_x$—CH$_2$—COOH or R—NH(CH$_2$—CH$_2$—CH$_2$—NH)$_x$—CH$_2$—CH$_2$—CH$_2$—COOH. If the polymeric hydrogel contains a carboxyl functional group, nonionic surfactants of formula R—O(CH$_2$—CH$_2$—O)$_x$—CH$_2$—CH$_2$—OH or polycationic surfactants of formula R—NH(CH$_2$—CH$_2$—CH$_2$—NH)$_x$—CH$_2$—CH$_2$—CH$_2$—NH$_2$ may be utilized to covalently modify the hydrogel. In the above formulas, R represents a $C_8$-$C_{18}$ hydrocarbon chain, preferably a $C_{12}$ or $C_{18:1}$ hydrocarbon chain, and x is from 1 to 10, preferably 3, in the surfactants containing nitrogen and from 4 to 16, preferably 10, 13, or 16, in the surfactants containing oxygen. These surfactants are commercially available. Examples of such commercially available surfactants include: POLYRAM O (available from Pierre Fitte, Paris, France); MARLIPAL 1850/12 (available from Chemische Werke Huls, Ltd., Marl, West Germany); and AKYPO RLM 100 (available from CHEM-Y, Emmerich, West Germany).

The covalent modification of the polymeric hydrogel polar functional groups results in various types of linkages between the hydrogel and the surfactant depending on the nature of the functional groups. Specifically, covalent modification of a hydrogel hydroxyl functional group with a carboxylated surfactant results in an ester linkage, as does covalent modification of a hydrogel carboxyl functional group with a nonionic surfactant containing hydroxyl groups. Covalent modification of a hydrogel carboxyl functional group with a cationic surfactant containing amine groups results in an amide linkage.

The covalent modification is carried out in a modification regulating medium. When modification of the polar functional groups of the entire polymer matrix is desired, the polymeric hydrogel is swollen in aqueous solutions containing 6 to 8 M urea, or in organic solvents, such as, formamide or dimethylformamide, preferably dimethylformamide. It has been found that this swelling of the polymeric hydrogel allows larger organic molecules, such as the surfactants utilized in the present invention, to penetrate and be absorbed by the polymer matrix. After the surfactants penetrate the polymer matrix, the surfactant molecules form covalent bonds with functional groups located within the matrix. This finding has been confirmed by diffusion studies of the polymer hydrogel in the presence of dyes. When only surface modification of the polymeric hydrogel is desired, a saline solution is utilized as the modification regulating medium. The saline solution does not cause any significant swelling of the polymeric hydrogel, and therefore does not allow the surfactant molecules to penetrate the polymer matrix. Rather, the surfactant molecules are sorbed by the surface of the polymeric hydrogel and subsequently form covalent bonds with functional groups located on or near the surface of the hydrogel.

As noted above, the covalent modifications of the polar functional groups, which are chemically defined as esterifications or amidifications depending on the type of surfactant and type of polar functional group, are catalysed by a carbodiimide coupling agent. This coupling agent may comprise water soluble carbodiimides, preferably 1-ethyl-3-(3-dimethylaminopropyl)-carbodiimide for surface modification, or carbodiimides soluble in organic solvents, preferably dicyclohexylcarbodiimide for matrix and surface modification.

The polymeric hydrogel may be in various forms or shapes when modified according to the above-described method. However, it is contemplated that the covalent modification of the present invention will find extensive use in the field of soft contact lenses, i.e., contact lenses formed from polymeric hydrogels of the above-described type. In the case of contact lenses, the covalent modification may be carried out by simply immersing the lens in a solution containing the selected surfactant, coupling agent and solvent. The lens is kept immersed (i.e., soaked) in the solution at a temperature generally ranging from about 20° C. to about 100° C. for a period ranging from about 5 minutes to about 2 hours; the preferred temperature range is 30° to 50° C. and the preferred period of immersement is 0.5 to 1 hour. Upon completion of the modification of the polymeric hydrogel, the soft lens material is removed from the modifying reaction mixture and equilibrated for at least 24 hours in saline solution (pH 7.2), whereupon the polymeric hydrogel regains any physical characteristics lost during the modifying process. The aforesaid lens equilibration process in saline is necessary in order to remove any unreacted or residual chemicals from the reaction mixture which may be irritating or damaging to the eye.

The process of this invention provides soft contact lens products which significantly inhibit the formation of protein, calcium, and lipid deposits. The following examples further illustrate the present invention, but should not be interpreted as limiting the scope of the invention in any manner.

EXAMPLE 1

Twenty soft contact lenses based on 2-hydroxyethyl methacrylate and methacrylic acid copolymer crosslinked with ethylene glycol dimethacrylate were immersed in 20 mL of dimethylformamide containing 0.4 M dicyclohexylcarbodiimide and 0.2 M oleyltetrapropylenepentamine, and were soaked for one hour at 40° C. The lenses were then soaked three times in 50 mL of dimethylformamide for two hours each to remove the surfactant and the carbodiimide. Finally, the lenses were equilibrated in saline solution (pH 7.2) for 24 hours at room temperature to remove solvent.

EXAMPLE 2

Fifteen soft contact lenses based on 2-hydroxyethyl methacrylate and ethylene glycol dimethacrylate were immersed in 20 mL of saline solution containing 0.1 M 1-ethyl-3-(3-dimethylaminopropyl)carbodiimide and 0.2 M oleyltetrapropylenepentamine-N-(carboxypropylic acid)-hydrochloride, and were soaked for two hours at 30° C. Thereafter, the lenses were equilibrated in 1N NaOH and saline solution for 24 hours at room temperature to remove solvent and reactants.

EXAMPLE 3

Ten soft contact lenses based on 2-hydroxyethyl methacrylate and methacrylic acid copolymer crosslinked with ethylene glycol dimethacrylate were immersed in 20 mL of dimethylformamide containing 0.2 M dicyclohexylcarbodiimide and 0.2 M oleyl(tetraoxyethylene)alcohol, and were soaked for 30 minutes at 50° C. The lenses were then soaked three times in 50 mL dimethylformamide for two hours each and equilibrated in saline solution for 24 hours at room temperature.

EXAMPLE 4

Twenty-five soft contact lenses based on 2-hydroxyethyl methacrylate and ethylene glycol dimethacrylate were immersed in 20 mL of saline solution containing 0.1 M 1-ethyl-3-(3-dimethylaminopropyl)-carbodiimide and 0.2 M dodecyl(decaoxyethylene)carboxymethylic acid, and were soaked for 1 hour at 30° C. Thereafter, the lenses were equilibrated in saline for 24 hours at room temperature.

EXAMPLE 5

Five soft contact lenses in which the entire matrix had been modified according to the procedure described in Example 1 were each soaked in 2.5 mL of 5 mM HCl. After removal of the lenses from the hydrochloric acid solutions, 2 mL portions of the hydrochloric acid solutions were titrated to neutral pH with 5 mM NaOH. The extent of modification of the lens with the polycationic surfactant was calculated quantitatively based on the difference in NaOH consumption between nonmodified lenses (control) and modified lenses. The extent of modification was found to be $1.4 \pm 0.2$ $\mu$moles surfactant sorbed per lens.

EXAMPLE 6

The same procedure as described in Example 5 was carried out with five soft contact lenses which were surface modified according to the procedure described in Example 2. The extent of modification was determined to be $0.3 \pm 0.05$ $\mu$moles surfactant sorbed per lens.

EXAMPLE 7

Five modified soft contact lenses from Example 1 and Example 2 were boiled for 8 hours in saline solution and the extent of modification was determined thereafter as described in Example 5 and Example 6; it was found that the sorption figures set forth in these examples remained unchanged. Soft contact lenses identical to those described in Examples 1 and 2 which were soaked in surfactant in the absence of the coupling agent (carbodiimides) were able to sorb the surfactant, but contained no detectable amounts of surfactant after being boiled for 8 hours.

These results indicate that sorbed surfactants can be easily removed and that the coupling agents are essential for covalent modification of the polymeric hydrogel.

EXAMPLE 8

The polycationic surfactants described in Example 1 and Example 2 are cytotoxic. They inhibit the growth of human epithelial cells in vitro. Five soft contact lenses which were not modified (control) or modified covalently according to the procedures described in Examples 1 and 2, and five soft contact lenses which contained sorbed rather than covalently bound polycationic surfactant were placed into monolayer cultures of human epithelial cells. As a result, the control lenses and covalently modified lenses allowed the growth of epithelial cells on the lens surface whereas lenses containing sorbed polycationic surfactant inhibited cellular growth on the lens surface.

The foregoing results indicate that the cytotoxic properties of the polycationic surfactant are eliminated after covalent binding to the polymeric hydrogel takes place.

EXAMPLE 9

Five unmodified soft contact lenses and five modified lenses of the same type as described in Examples 1 and 4 were exposed to a laboratory model for protein deposition. The deposition solution (300 mL saline) contained 0.15 g mucin and 0.15 g lysozyme, and had a pH of 7.03. The lenses were individually placed into sealed vials containing a 5 mL deposition solution and were heat cycled (one heat cycle is equal to heating at 90°–92° C. for one hour and then cooling to room temperature). After heat cycling each lens was removed from its vial and rubbed lightly with saline to remove unbound material.

The deposition cycle was repeated as necessary until deposits were heavily formed. The lens deposit classification system described by Rudko in U.S. Pat. No. 3,910,296 was utilized as follows. First, heaviness (visibility) of the deposit is subdivided into four classes:
Class I: Clean
Class II: Visible under oblique light when wet or dry using seven fold magnification
Class III: Visible when dry with the unaided eye
Class IV: Visible when wet with the unaided eye.
The individual classes of deposits are further subdivided into four categories (A–D) based on the extent of the deposit on the lens surface area:
A: 0%–25%
B: 25%–50%
C: 50%–75%
D: 75%–100%.

The covalently modified lenses maintained Class I over 5 deposition cycles whereas the control (i.e., unmodified) lenses were typically in Class IIC after one heating cycle, in Class IIID after two heating cycles and in Class IVD after three heating cycles. Similar results were found with calcium and lipid deposition models. These results demonstrate the significant prophylactic activity (deposit prevention) possessed by the modified soft contact lenses of the present invention.

The invention has been described herein with reference to certain preferred embodiments. However, as obvious variations thereon will become apparent to those skilled in the art, the invention is not to be considered as limited thereto.

What is claimed is:

1. An improved polymeric hydrogel, comprising a polymeric hydrogel that has been modified by treating unmodified polymeric hydrogel containing polar functional groups with a surfactant selected from: carboxylated surfactants of formula (I): $R-O(CH_2-CH_2-O)_x-CH_2-COOH$ and formula (II): $R-NH(CH_2-CH_2-CH_2-NH)_x-CH_2-CH_2-CH_2-COOH$; nonionic surfactants of formula (III): $R-O(CH_2-CH_2-O)_x-CH_2-CH_2-OH$; polycationic surfactants of formula (IV): $R-NH(CH_2-CH_2-CH_2-NH)_x-CH_2-CH_2-NH_2$; wherein R is a $C_8$ to $C_{18}$ hydrocarbon chain and x is from 1 to 10 in the surfactants containing nitrogen and from 4 to 16 in the surfactants containing oxygen, said treatment being carried out in a modification regulating medium selected from the group consisting of urea, organic solvents and saline solutions, said modification regulating medium containing a carbodiimide coupling agent.

2. The improved polymeric hydrogel of claim 1, wherein the hydrogel polar functional groups comprise hydroxyl groups and the surfactant is a carboxylated surfactant of formula (I) or (II).

3. The improved polymeric hydrogel of claim 2, wherein the carbodiimide coupling agent is water soluble and the modification regulating medium is selected from the group consisting of saline solutions and aqueous solutions containing 6 to 8 M urea.

4. The improved polymeric hydrogel of claim 3, wherein the carbodiimide coupling agent is 1-ethyl-3-(3-dimethylaminopropyl)-carbodiimide and the modification regulating medium is a saline solution.

5. The improved polymeric hydrogel of claim 2, wherein the carbodiimide coupling agent is soluble in an organic solvent and the modification regulating medium comprises an organic solvent.

6. The improved copolymeric hydrogel of claim 5, wherein the carbodiimide coupling agent is dicyclohexylcarbodiimide and the modification regulating medium is selected from the group consisting of formamide and dimethylformamide.

7. The improved polymeric hydrogel of claim 1, wherein the hydrogel polar functional groups comprise carboxyl groups and the surfactant is a nonionic surfactant of formula (III) or a polycationic surfactant of formula (IV).

8. The improved polymeric hydrogel of claim 7, wherein the carbodiimide coupling agent is water soluble and the modification regulating medium is selected from the group consisting of saline solutions and aqueous solutions containing 6 to 8 M urea.

9. The improved polymeric hydrogel of claim 8, wherein the carbodiimide coupling agent is 1-ethyl-3-

(3-dimethylaminopropyl)-carbodiimide and the modification regulating medium is a saline solution.

10. The improved polymeric hydrogel of claim 7, wherein the carbodiimide coupling agent is soluble in an organic solvent and the modification regulating medium comprises an organic solvent.

11. The improved polymeric hydrogel of claim 10, wherein the carbodiimide coupling agent is dicyclohexylcarbodiimide and the modification regulating medium is selected from the group consisting of formamide and dimethylformamide.

12. A modified polymeric hydrogel, comprising a polymeric hydrogel containing polar functional groups selected from hydroxyl and carboxyl, at least some of said polar functional groups being covalently bonded to a surfactant selected from: carboxylated surfactants of formula (I): $R-O(CH_2-CH_2-O)_x-CH_2-COOH$ and formula (II): $R-NH(CH_2-CH_2-CH_2-NH)_x-CH_2-CH_2-CH_2-COOH$; nonionic surfactants of formula (III): $R-O(CH_2-CH_2-O)_x-CH_2-CH_2-OH$; and polycationic surfactants of formula (IV): $R-NH(CH_2-CH_2-CH_2-NH)_x-CH_2-CH_2-CH_2-NH_2$; wherein R is a $C_8$ to $C_{18}$ hydrocarbon chain, and x is from 1 to 10 in the surfactants containing nitrogen and from 4 to 16 in the surfactants containing oxygen.

13. The polymeric hydrogel of claim 12, wherein the polymeric hydrogel comprises an acrylic acid based polymeric hydrogel.

14. The polymeric hydrogel of claim 13, wherein the polymeric hydrogel contains hydroxyl functional groups, and the surfactants bonded to the functional groups are carboxylated surfactants of formula (I) or formula (II).

15. The polymeric hydrogel of claim 13, wherein the polymeric hydrogel contains carboxyl functional groups, and the surfactants bonded to the functional groups are nonionic surfactants of formula (III) or polycationic surfactants of formula (IV).

16. The polymeric hydrogel of claim 12, wherein the hydrogel polar functional groups bonded to the surfactants are located on or near the surface of the lens.

17. The polymeric hydrogel of claim 12, wherein the hydrogel polar functional groups bonded to the surfactants are located throughout the lens.

18. A method of modifying polymeric hydrogels to improve the resistance of the hydrogels to the formation of calcium, lipid and protein deposits thereon, comprising:

immersing the polymeric hydrogel in a modification regulating medium containing a coupling agent and a surfactant selected from: carboxylated surfactants of formula (I): $R-O(CH_2-CH_2-O)_x-CH_2-COOH$ and formula (II): $R-NH(CH_2-CH_2-CH_2-NH)_x-CH_2-CH_2-CH_2-COOH$; nonionic surfactants of formula (III): $R-O(CH_2-CH_2-O)_x-CH_2-CH_2-OH$; and polycationic surfactants of formula (IV): $R-NH(CH_2-CH_2-CH_2-NH)_x-CH_2-CH_2-CH_2-NH_2$; wherein R is a $C_8$ to $C_{18}$ hydrocarbon chain and x is from 1 to 10 in the surfactants containing nitrogen and from 4 to 16 in the surfactants containing oxygen;

soaking the polymeric hydrogel in the modification regulating medium for from about 5 minutes to 2 hours at a temperature of from about 20° to 100° C.; and removing the polymeric hydrogel from the modification regulating medium.

19. The method of claim 18, further comprising soaking the polymeric hydrogel in saline solution for at least 24 hours to allow the polymeric hydrogel to regain any physical characteristics lost during the modification process and remove any unreacted or residual chemicals from the reaction mixture.

20. The method of claim 19, wherein the polymeric hydrogel comprises an acrylic acid based polymeric hydrogel in the form of a soft contact lens.

21. A modified soft contact lens obtained by means of the method of claim 19.

* * * * *